United States Patent [19]
Akimoto et al.

[11] Patent Number: 5,559,569
[45] Date of Patent: Sep. 24, 1996

[54] MOTOR DRIVEN SHUTTER HAVING FOCUS ADJUSTING AND STOP SETTING MEANS

[75] Inventors: Kazuo Akimoto; Toshiaki Hirai, both of Chiba-ken, Japan

[73] Assignee: Seikosha Co., Ltd., Tokyo, Japan

[21] Appl. No.: 336,443

[22] Filed: Nov. 9, 1994

Related U.S. Application Data

[62] Division of Ser. No. 83,806, Jun. 28, 1993, Pat. No. 5,420,660.

[30] Foreign Application Priority Data

Sep. 14, 1992 [JP] Japan ..................... 4-244985
Jan. 12, 1993 [JP] Japan ......................... 5-3383

[51] Int. Cl.$^6$ ....................................... G03B 7/00
[52] U.S. Cl. ................... 354/195.11; 354/271.1; 354/439; 354/440
[58] Field of Search ..................... 354/400, 402, 354/439, 440, 195.1, 195.11, 234.1, 271.1

[56] References Cited

U.S. PATENT DOCUMENTS

| 3,176,600 | 4/1965 | Tokar | 354/195.11 |
| 4,107,714 | 8/1978 | Raab | 354/195.11 |
| 4,338,011 | 7/1982 | Pizzuti | 354/195.11 |
| 4,710,013 | 12/1987 | Wong | 354/402 X |

*Primary Examiner*—Russell E. Adams
*Assistant Examiner*—J.K. Han
*Attorney, Agent, or Firm*—Jordan and Hamburg

[57] ABSTRACT

A motor driven shutter by which various operational modes are freely selectable and photographing timing is shortened includes springs and a motor arranged in a manner freely selectable as driving forces for opening and closing the shutter and are combined or selected corresponding to the operational mode. The photographing timing is shortened by operating in parallel an F number setting operation and a focus adjusting operation. Various modes may be selected according to the photographing purpose, and the photographing timing may be shortened.

3 Claims, 18 Drawing Sheets

13 ELECTRONIC CONTROL CIRCUIT

MOTOR DRIVEN SHUTTER HAVING FOCUS ADJUSTING AND STOP SETTING MEANS

This is a division, of application Ser. No. 08/083,806, filed Jun. 28, 1993, U.S. Pat. No. 5,420,660.

FIELD OF THE INVENTION

The present invention relates to a shutter for a camera and more particularly to a motor driven shutter in which control of a photographic lens, setting of an F number and exposure operations are carried out by a single motor.

DESCRIPTION OF RELATED ART

A shutter for a camera using springs as a driving force for opening and closing it had been put into practical use, and recently a shutter which is opened and closed by a motor such as a step motor whose operating speed is relatively stably controlled has also been put into practical use.

When springs are used, although a high speed shutter may be realized since shutter blades are activated rapidly, an effective control cannot be achieved unless a governor and the like is used in order to realize a flash-matic shutter or day-light synchronization. On the other hand, although day-light synchronization and the like may be readily realized by a motor driven shutter without a governor and the like, it is not easy to realize a high speed shutter.

Further, although so-called post-synchronization in which a strobe is flashed in a process of gradually closing shutter blades by controlling their closing speed is publicly known, it is unfavorable to the movement of a camera.

Furthermore, a method of setting an intermediate value Fc when the difference between day-light synchronization Fb and flash-matic Fa is great is known as shown in FIG. 20. This is merely a method of finding a compromise point between both objects by setting the intermediate value Fc and cannot achieve the fundamental aim of assuring an optimum exposure.

A motor driven shutter in which an exposure time is automatically controlled in accordance with a selected F number has already been proposed (for example Japanese Patent Laid-Open No. 3-89331). However, when such a shutter is also allowed to control a photographic lens, the time from when a photographer starts a photographing action to when the shutter actually operates is prolonged, thus causing a shutter chance to be easily missed. Also since the focusing time changes depending on the range to an object, it gives the photographer a sense of incompatibility and is not desirable.

In order to solve the aforementioned problems, the applicants of the present invention have made one proposal (Japanese Patent Application No. 4-63483) to shorten the time to be able to accommodate a shutter change as much as possible.

SUMMARY OF THE INVENTION

It is an object of the present invention to overcome the disadvantages of the aforementioned shutter driven by springs and of a motor driven shutter by causing both of them to coexist so that they may be used according to use and by shortening the focusing operations of the photographic lens as short as possible.

A motor driven shutter of the present invention is constructed so that a driving member which is activated by a single motor which rotates in either direction activates opening and closing members and a biasing force is added to each of the members by a spring so that they are freely selected by a selecting means.

Further, it is constructed so that focusing operations of a photographic lens is controlled by the driving member so that it accommodates to shutter chances by carrying out F number setting operations in parallel with the above focusing operations.

DESCRIPTION OF THE PREFERRED EMBODIMENTS

Figure 1:
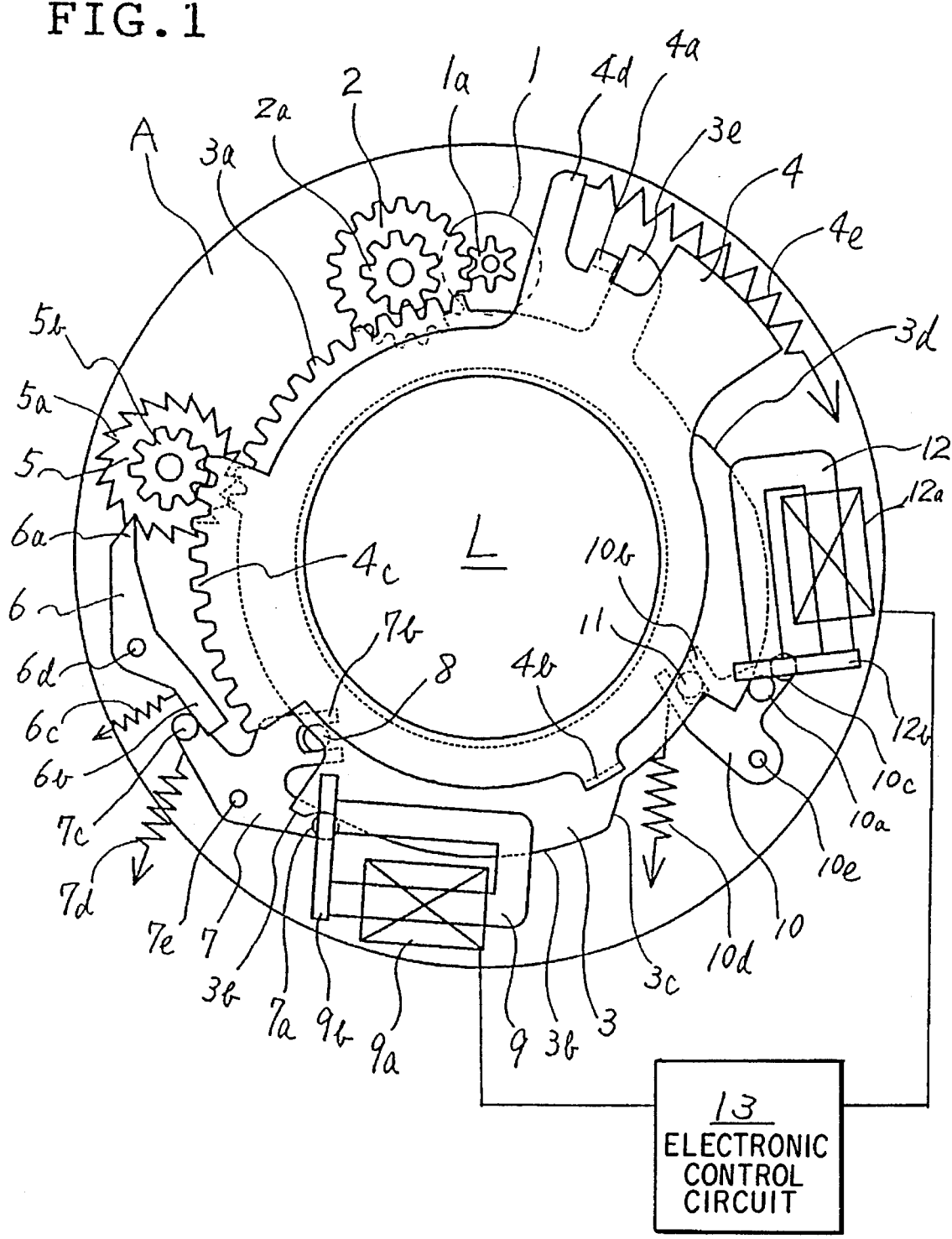
FIG. 1 is a plan view illustrating one embodiment of the invention before starting an operation.

Referring now to the drawings, one preferred embodiment of the present invention will be explained in detail.

Figure 16:
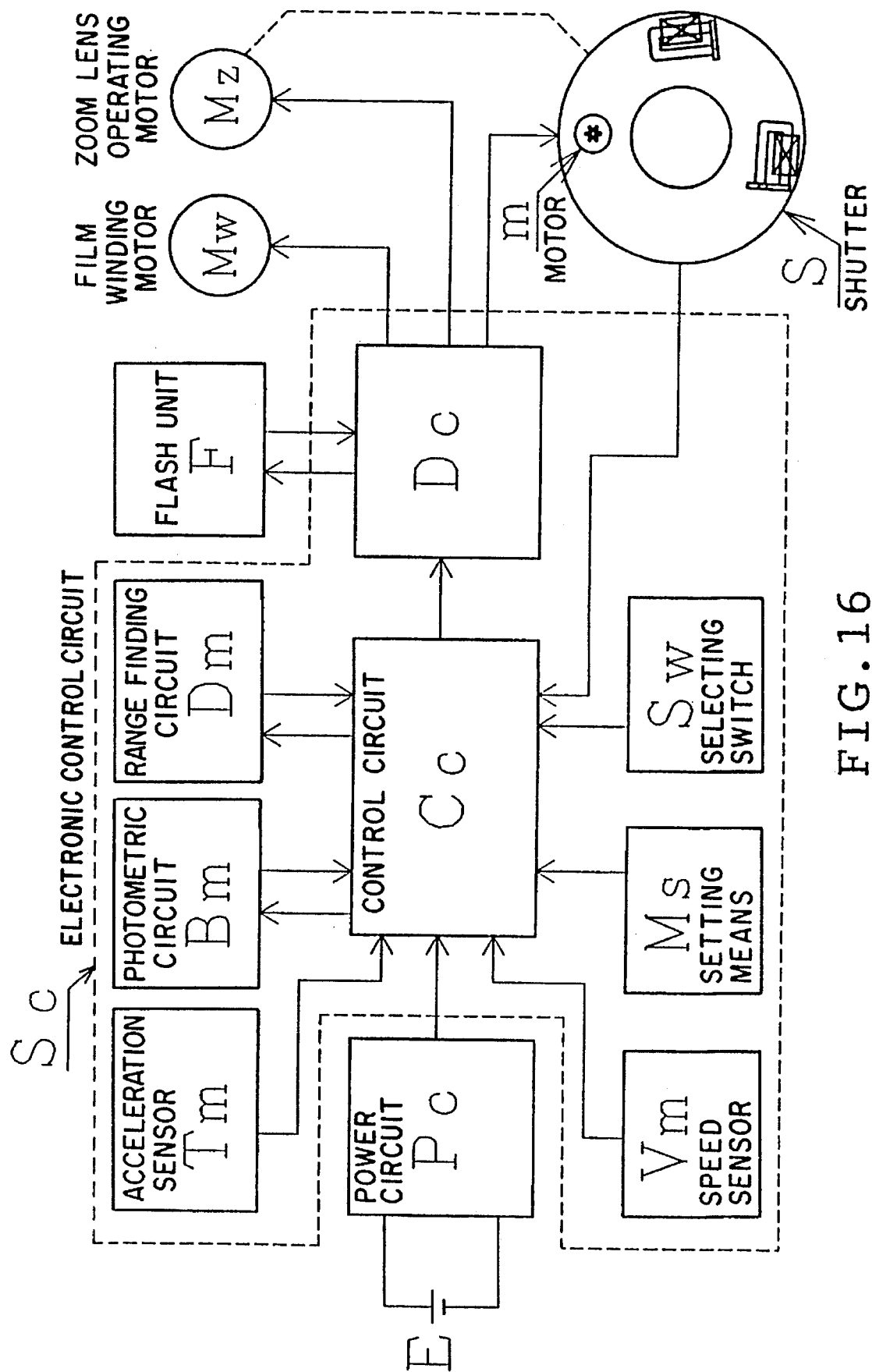
FIG. 16 is a block diagram illustrating the whole structure of one embodiment of the invention.

FIG. 16 is a structural diagram showing an outline of the present invention. A shutter S which includes a motor m and bears also a photographic lens driving section is controlled by an electronic circuit Sc which is a means for selecting respective operating modes. The electronic circuit Sc is supplied with battery power E through the intermediary of a power circuit Pc and controls a flash unit F, film winding motor Mw and zoom lens operating motor Mz, together with the shutter S. The electronic circuit Sc has a control circuit Cc for controlling deliver-and-receive signals between a photometric circuit Bm for measuring brightness of an object and a range finding circuit Dm for measuring the distance to an object and is connected with a setting means Ms for selecting various photographic modes and a switch Sw for inputting a selected signal. The control circuit Cc activates the shutter S, flash unit F, film winding motor Mw, zoom lens operating motor Mz and others through the intermediary of a driving circuit Dc.

In FIG. 1, a permanent magnet rotor 1 which is a step motor secured to a shutter board A is rotatably supported together with a pinion 1a. A gear 2 is created as one body with a pinion 2a which rotatably engages the pinion 1a. A driving ring 3 is provided with a gear 3a which engages with the pinion 2a, a cam portions 3b, 3c and 3d which are control sections and a protrusion 3e and is rotatably supported around a photographic lens L.

A range ring 4 for moving the photographic lens L from a stop position to a focus position has a bent portion 4a which engages with the protrusion 3e, a bent portion 4b for operating the photographic lens L, a gear 4c and a protrusion 4d and is urged with a clockwise turning force (in FIG. 1) around the photographic lens L by a spring 4e which acts on the protrusion 4d.

A ratchet 5 has a ratchet portion 5a and is rotatably supported by being created in one body with a pinion 5b which engages with the gear 4c. An anchor lever 6 has an anchor portion 6a which engages with the ratchet portion 5a and a protrusion 6b which extends in the other direction and is pivoted on a pivot 6d while being urged with a clockwise turning force (in FIG. 1) by a spring 6c.

An opening lever 7 has a control portion 7a which engages with the cam portions 3b and 3c, a fork portion 7b and an operating pin 7c which engages with the protrusion 6b and is rotatably pivoted on a pivot 7e while being urged with a counterclockwise turning force (in FIG. 1) by a spring 7d. A pin 8 activates shutter blades (not shown) and is engaged with the fork portion 7b. An electromagnet 9 is excited by means of a coil 9a and absorbs and holds a magnetic piece 9b which engages with the control portion 7a resisting the bias of the spring 7d to constrain and control operation of the opening lever 7.

A closing lever 10 has a pin 10a which engages with the cam portion 3d, a fork portion 10b and a control portion 10c and is rotatably pivoted on a pivot 10e while being urged with a counterclockwise turning force (in FIG. 1) by a spring 10d. A pin 11 activates the diaphragm blades (not shown) and is engaged with the fork portion 10b.

An electromagnet 12 is excited by means of a coil 12a and adsorbs and holds a magnetic piece 12b which engages with the control section 10c resisting against the spring 10d to constrain and control operation of the closing lever 10. An electronic circuit 13 which selectively controls feeding to the coils 9a and 12a of the electromagnets 9 and 12 is switched by selecting modes of the camera.

Figure 2:
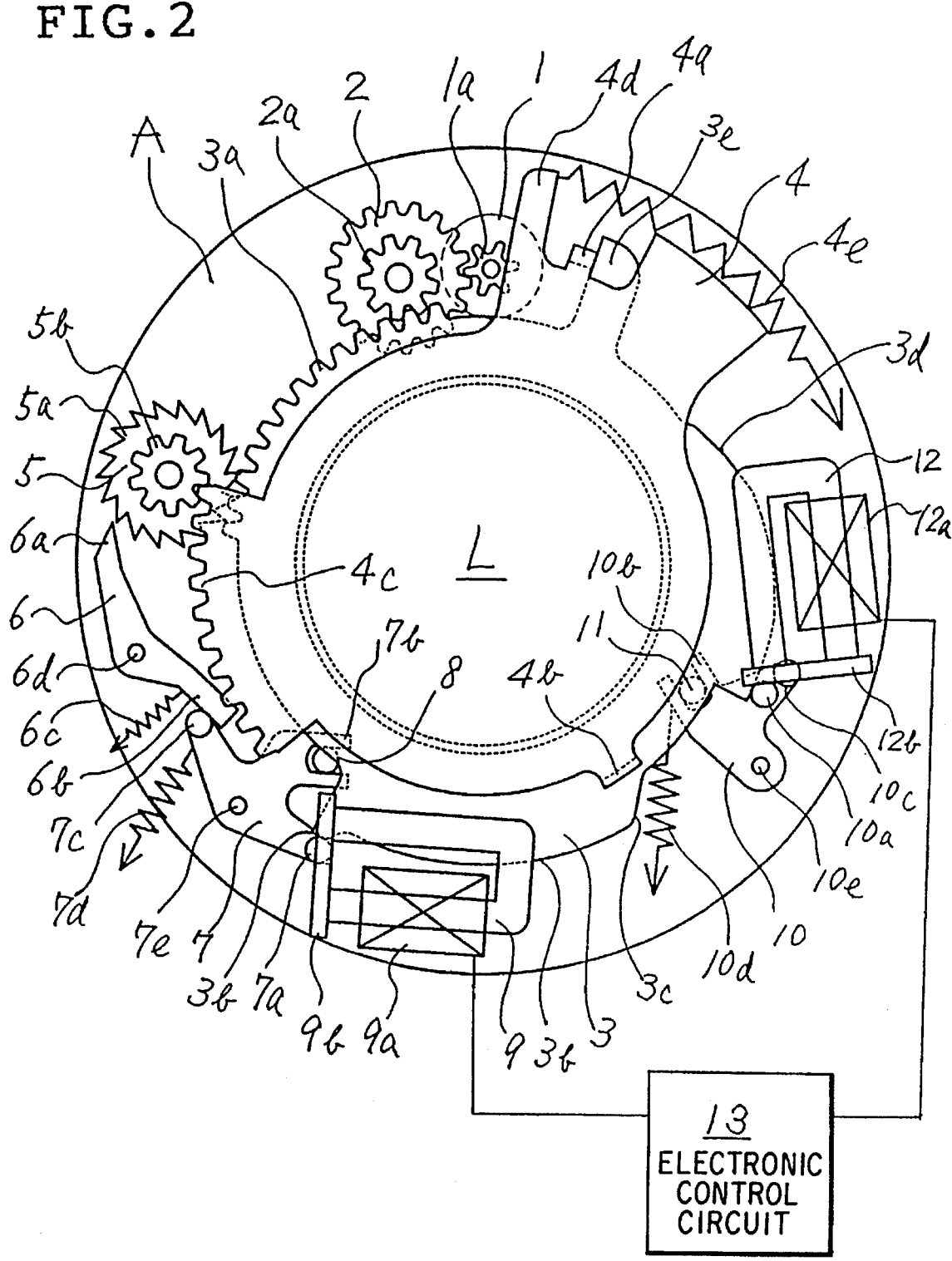
FIG. 2 is a plan view illustrating one embodiment of the invention right after the operation.

The method for operating the camera having the aforementioned structure constructed on the shutter board A in a case when an exposure operation is carried out in accordance to a preselected F number will be explained. When the step motor rotates counterclockwise from the state in FIG. 1, the rotor 1 turns counterclockwise and the driving ring 3 is turned counterclockwise together with the range ring 4 resisting the bias of the spring 4e by the gear 3a through the intermediary of the gear 2. At this time, the control section 7a of the opening lever 7 is pushed by the left end of the cam portion 3b, so that the iron piece 9b slides along the adsorbing plane of the electromagnet 9 by a known method. The anchor lever 6 is turned counterclockwise because the protrusion 6b is pushed by the operating pin 7c and the anchor portion 6a comes off from the working range of the ratchet portion 5a. The ratchet portion 5a is created so that although it turns while pushing up the anchor portion 6a when it turns clockwise, its operation is constrained by the anchor portion 6a when it turns counterclockwise. When the motor operates up to this state, the electronic circuit 13 feeds power to the coil 9a, so the electromagnet 9 is excited and adsorbs and holds the iron piece 9b to constrain the opening lever 7 in a non-operational state (a state shown in FIG. 2).

Figure 3:
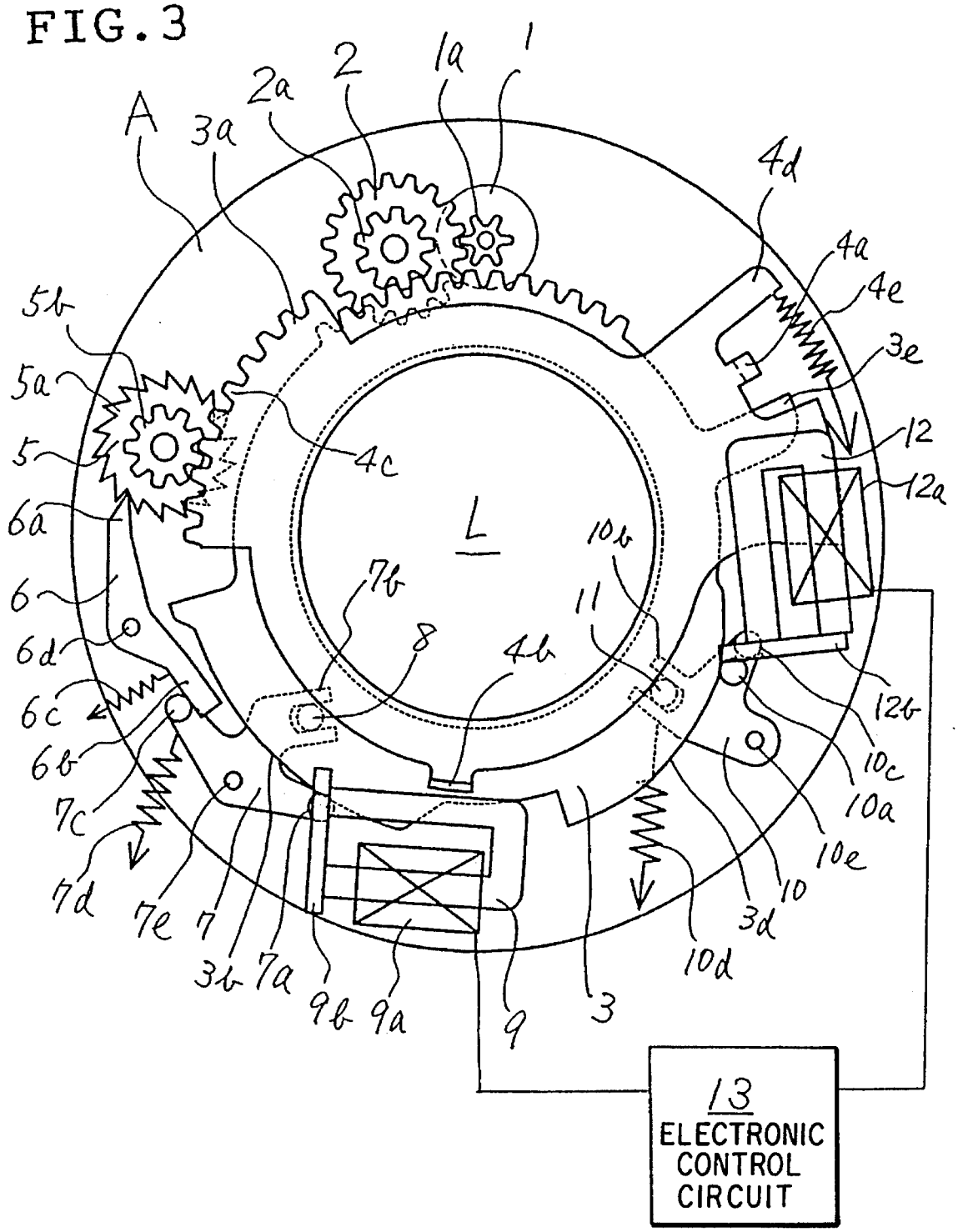
FIG. 3 is a plan view illustrating a focus point of one embodiment of the invention.

The step motor starts to rotate clockwise and the driving ring 3 turns the range ring 4 clockwise by the spring 4e while causing the bent portion 4a to follow the protrusion 3e and at the same time, turns the ratchet 5 counterclockwise by the gear 4c. In this process, when a focus position of the photographic lens L is confirmed by a known method, the step motor temporary stops and the feeding to the coil 9a by the electronic circuit 13 is cut off, so that the opening lever 7 turns counterclockwise by the spring 7d until the control portion 7a and the cam portion 3b abut again. Therefore, the protrusion 6b follows the operating pin 7c and the anchor lever 6 turns clockwise by the spring 6c to the position where the anchor portion 6a anchors the ratchet portion 5a. Accordingly, the range ring 4 can no longer follow the driving ring 3 and the photographic lens L is set at the focus position (a state shown in FIG. 3).

Figure 4:
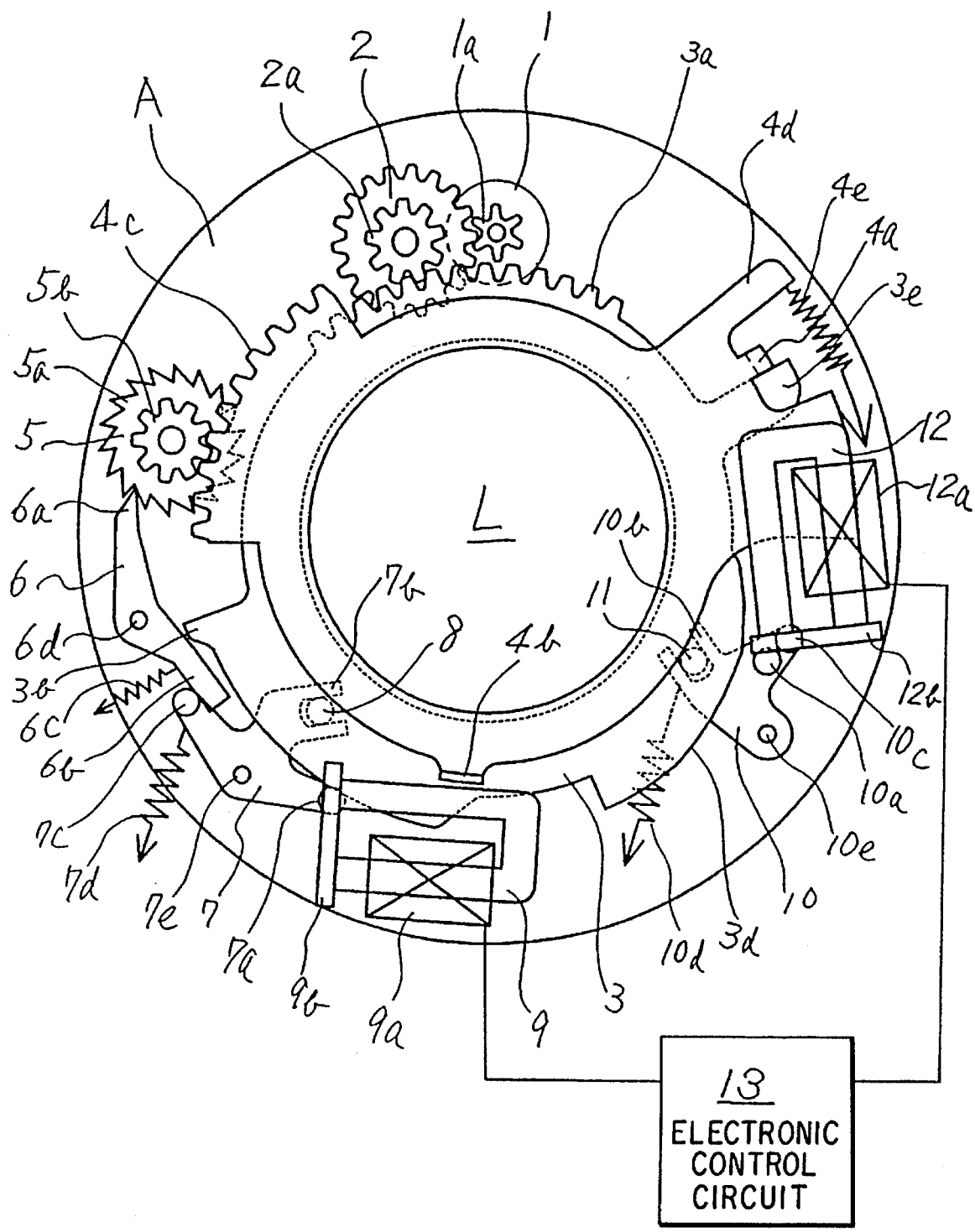
FIG. 4 is a plan view illustrating one embodiment the invention after setting an F number.

Synchronizing with the starting of clockwise rotation of the step motor, the electronic circuit 13 controls the timing for feeding power to the coil 12a to set a stop of the photographic lens L. That is, since no power is fed to the coil 12a, the pin 10a follows the cam portion 3d when the driving ring 3 turns clockwise, the closing lever 10 turns counterclockwise by the spring 10d and the step motor rotates clockwise operating the pin 11 until reaching a predetermined F number. Then the electronic circuit 13 feeds the coil 12a to excite the electromagnet 12 and adsorbs and holds the iron piece 12b to constrain the closing lever 10 in a nonoperational state at a position of the cam portion 3d which corresponds to the predetermined F number resisting against the bias of spring 10d (a state shown in FIG. 4). Since the two electromagnets 9 and 12 are independently controlled, it is not unequivocal as to which is set first as regards to corresponding to the focus position and F number setting position.

Figure 5:
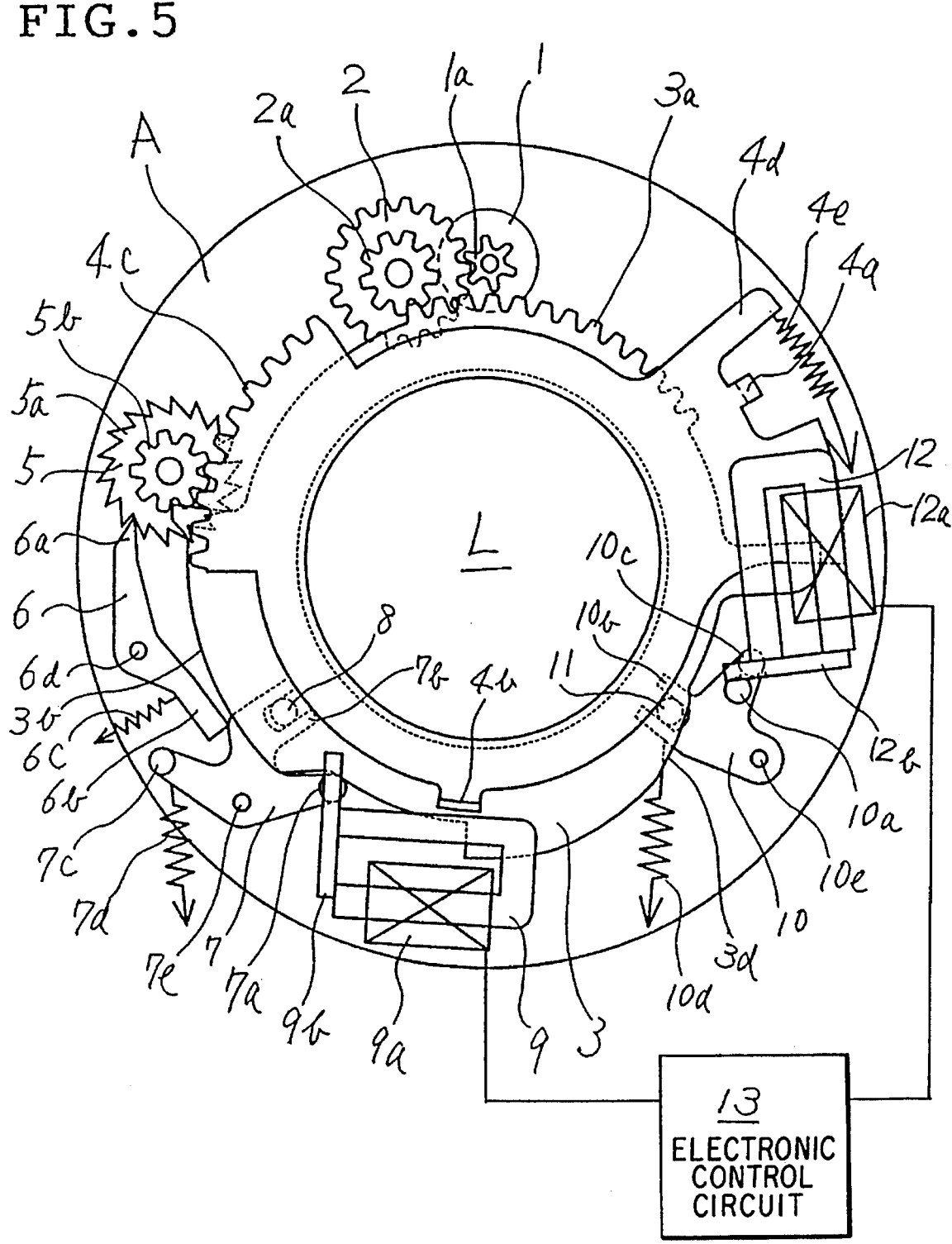
FIG. 5 is a plan view illustrating one embodiment of the invention during a shutter opening operation.

When the step motor succeedingly rotates clockwise, the electronic circuit 13 again feeds power to the coil 9a and excites the electromagnet 9, so that the operation of the opening lever 7 is again constrained and the feeding to the electromagnet 9a is cut off when the control portion 7a passes through the operating range of the cam portion 3c. At this time, the opening lever 7 is rapidly turned counterclockwise by the spring 7d and activates the pin 8 to activate the shutter blades (not shown) in the direction where the stop is rapidly opened to start an exposure operation (a state shown in FIG. 5). If a flash of light is needed, it is flashed at this point (a state shown in FIG. 8).

Figure 6:
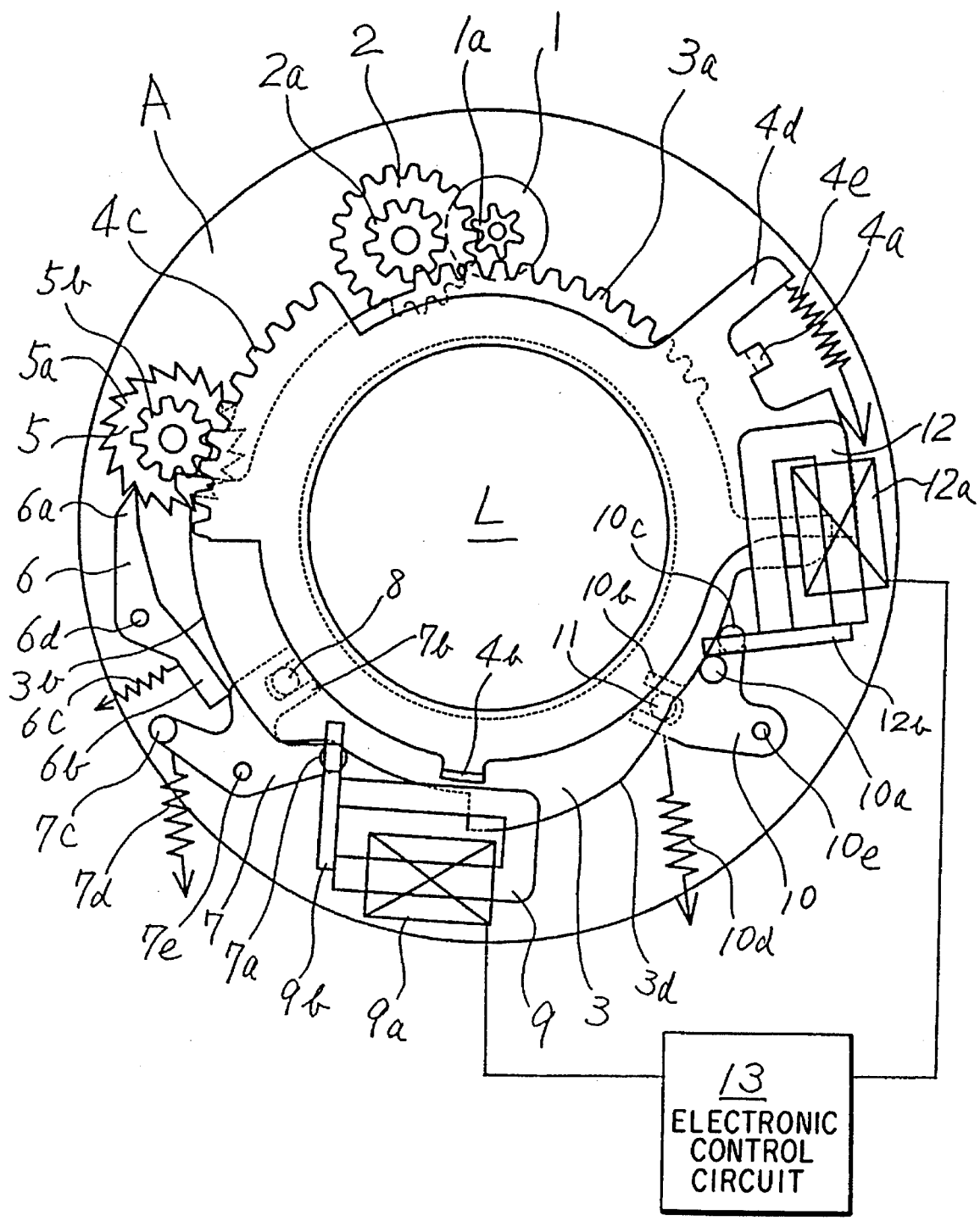
FIG. 6 is a plan view illustrating one embodiment of the invention in a state when the shutter exposure operation has been finished.
Figure 7:
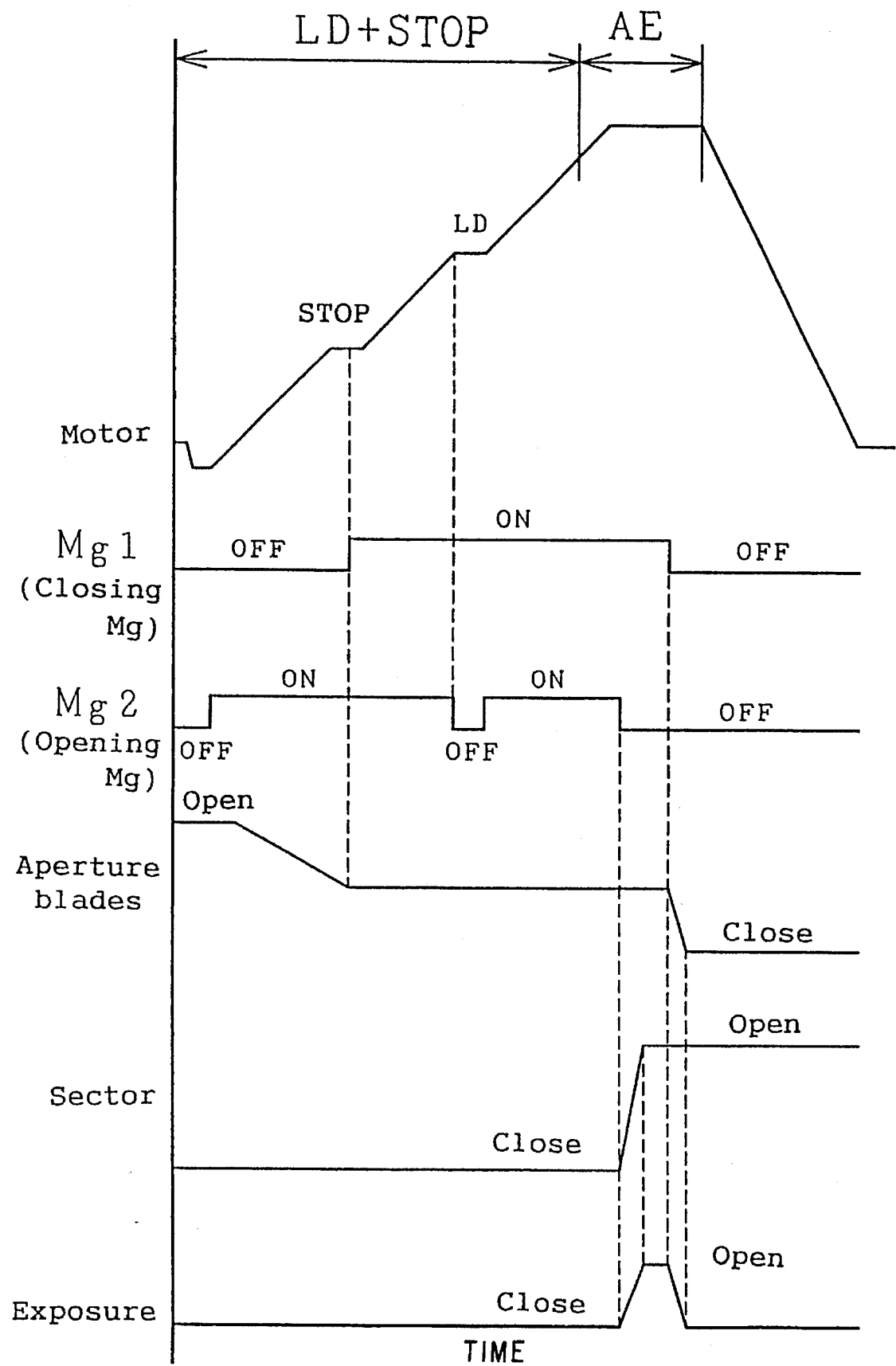
FIG. 7 is a diagram illustrating a series of operation sequences according to one embodiment of the invention.

The stop is set at the F number at the position where the electromagnet 12 constrains the closing lever 10 relying on the cam portion 3d as described above. When a desired exposure time has elapsed, the electronic circuit 13 cuts off the feeding to the coil 12a and demagnetizes the electromagnet 12, so that the closing lever 10 is rapidly turned counterclockwise by the spring 10d and activates the pin 11 to rapidly closes the aforementioned diaphragm blades and to end the exposure (a state shown in FIG. 6). The aforementioned operations may be illustrated corresponding to the lapse of time as shown in FIG. 7.

Then when the step motor 1 rotates counterclockwise, the driving ring 3 turns counterclockwise together with the range ring 4 resisting the bias of the spring 4e. At this time, the ratchet 5 is turned right by the gear 4c while pushing up the anchor portion 6a similarly to the case in the beginning of the operation when it was turned counterclockwise as described before.

On the other hand, the opening lever 7 is turned counterclockwise resisting the bias of the spring 7d because the control portion 7a is pushed by the cam portion 3c, and activates the pin 8 to close the shutter blades which are in an open state. When the step motor 1 further rotates counterclockwise, the closing lever 10 is turned clockwise resisting the bias of the spring 10d because the control portion 10c is pushed by the cam portion 3d and activates the pin 11 to open the diaphragm blades which are in a closed state. The step motor 1 stops when it reaches the initial state shown in FIG. 1 and ends one sequence of operation.

Next, the operation for implementing a programmed exposure operation according to the brightness of an object will be explained excerpting only parts which differ from the ones described above. When the step motor 1 rotates clockwise, the electromagnet 9 is demagnetized and the ratchet 5 is stopped, the electronic circuit 13 stops feeding power to the coil 9a but continues to feed to the coil 12a. When the step motor 1 rotates clockwise further in this state, the control portion 7a follows along the slope of the cam portion 3c by the urging force of the spring 7d and turns the opening lever 7 counterclockwise around the axis 7e. Accordingly, the pin 8 opens the shutter blades (not shown) with a speed that corresponds to the slope of the cam portion 3c that depends on the clockwise rotation of the step motor 1. When the exposure reaches a half of what corresponds to the brightness of the object, the step motor 1 rotates counterclockwise and hence the driving ring 3 turns counterclockwise, turns the opening lever 7 clockwise resisting the bias of the spring 7d and closes the shutter blades to end the exposure. Then the electronic circuit 13 cuts off the feeding to the coil 12a to return to the initial state shown in FIG. 1, similarly to the case described above.

Figure 9:
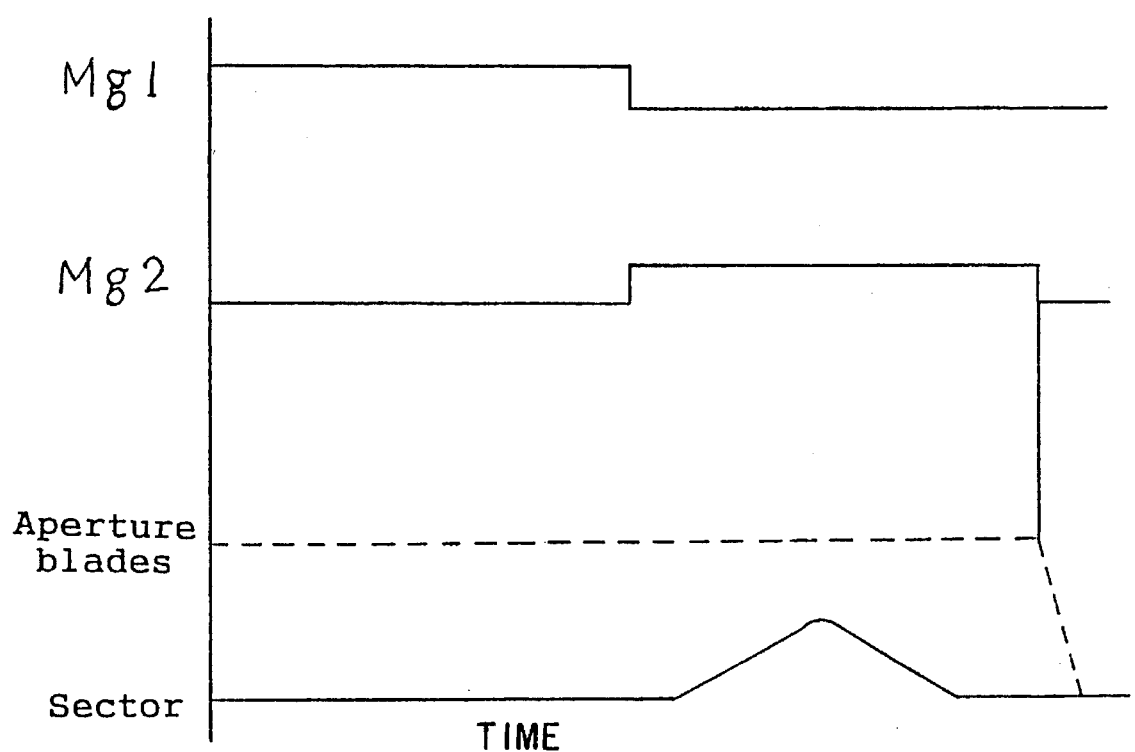
FIG. 9 is a diagram illustrating the opening and closing operation by a motor according to one embodiment of the invention.

The exposure operation is carried out within a time that corresponds to the rotating speed of the step motor 1 by operating the shutter blades only by the opening lever 7. FIG. 9 shows opening and closing waveforms vs. the lapsed time of the shutter blades in this case. Even in the programmed exposure operation, the following operation is carried out in order to bring about a photographing effect according to the purpose as shown in FIGS. 10 or 11.

Figure 10:
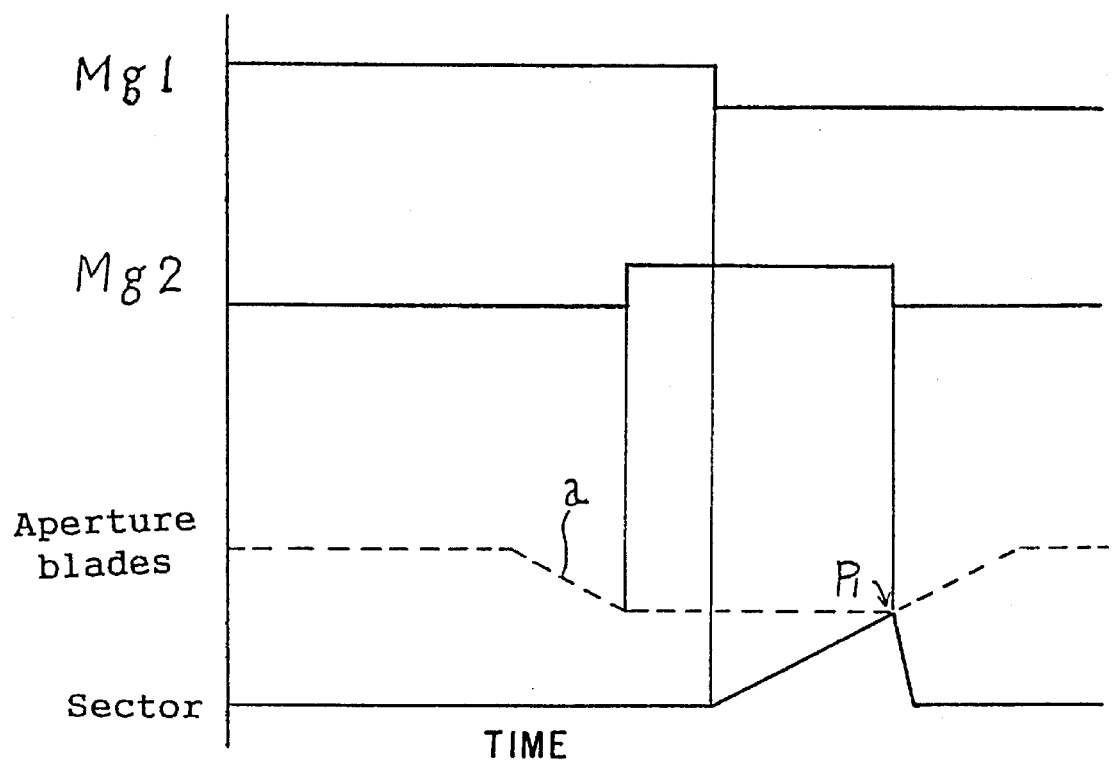
FIG. 10 is a diagram illustrating an operation to open by the motor and close by the springs according to one embodiment of the invention.
Figure 11:
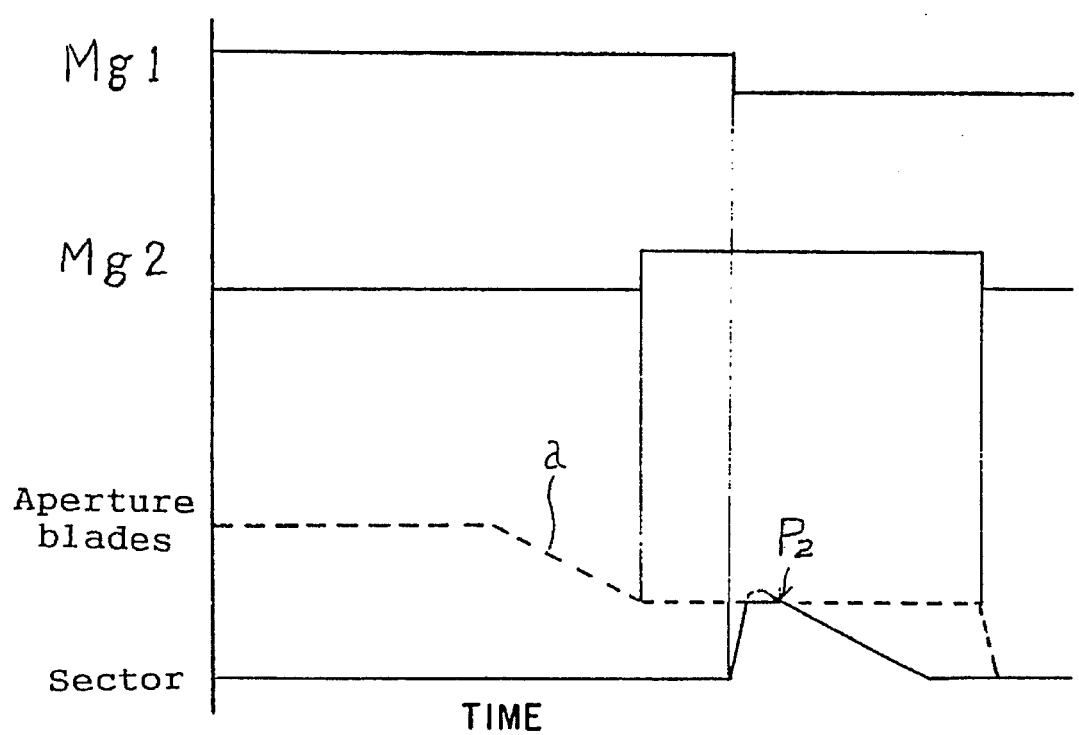
FIG. 11 is a diagram illustrating an operation to open by the springs and close by the motor according to one embodiment of the invention.

In the case of FIG. 10, the step motor 1 in the above explanation continues to rotate clockwise without rotating counterclockwise even if an exposure reaches the half of the aforementioned exposure. Then when the exposure reaches the exposure which almost corresponds to the brightness of the object, the electronic circuit 13 cuts off the feeding to the coil 12a to demagnetize the electromagnet 12, so that the closing lever 10 is activated to rapidly close the diaphragm blades and to end the exposure.

In this case, the closing timing may be effectively controlled by dislocating the diaphragm blades to a position that corresponds to the point P1 in FIG. 10 during when the cam portion 3d moves (shown by a dotted line a in FIG. 10) and by causing it to stand by at the position P1 by the electromagnet 12 before the driving ring 3 rotates clockwise and the cam portion 3c starts to control the opening operation. Such a method allows the shutter to be rapidly closed, so that it is effective for reducing the influence of movement of the camera to the photographing plane.

Figure 21:
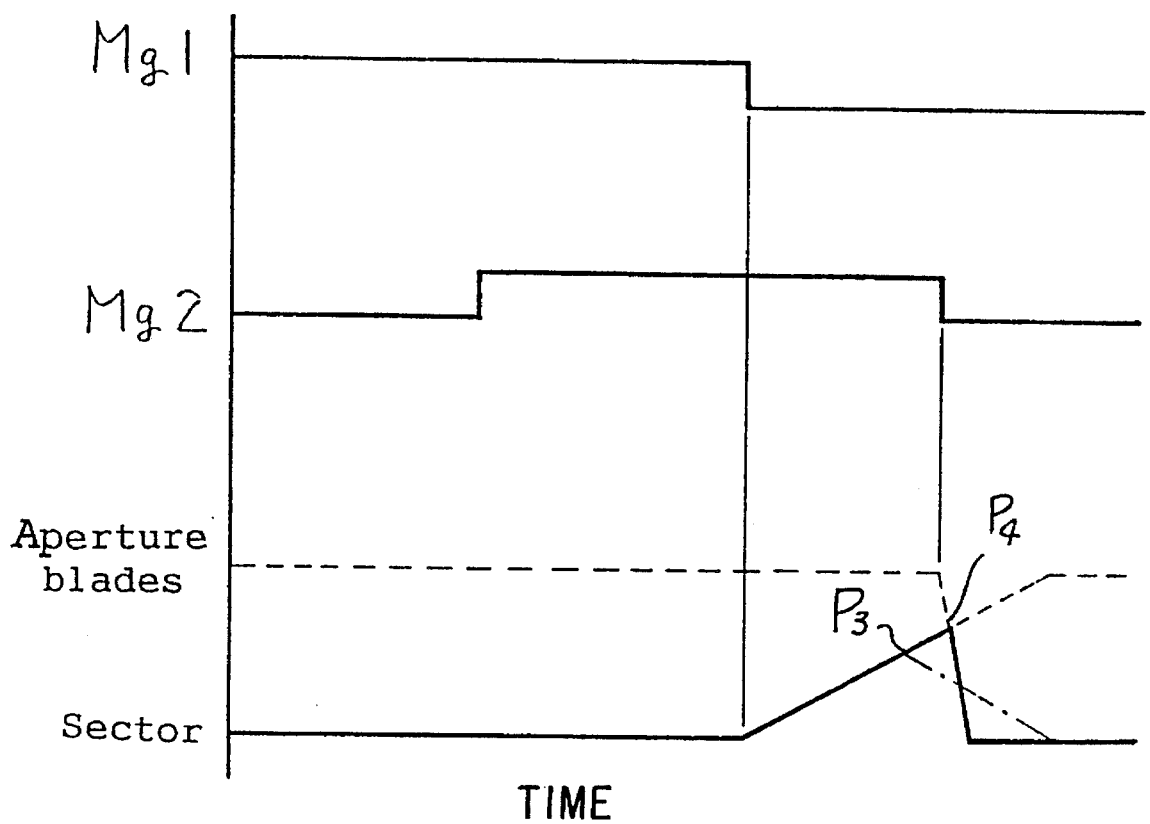
FIG. 21 is a diagram illustrating an operation for preventing blur ring of the camera according to one embodiment of the invention.

An acceleration sensor Tm and others in FIG. 16 comprise a vibration detecting means for detecting, when movement of the camera and the like occurs, relative movement of the camera body to the photographing plane to output a signal for recognizing the movement when a level of the signal exceeds a signal level predetermined by the electronic circuit Sc. Referring to FIG. 21, its operation will be explained.

The programmed exposure operations shown in FIG. 9 are operations carried out by combining a small opening and a long time when the brightness of the object is relatively bright. Although such exposure is effective as regards blur on the focus depth, it is unfavorable to movement of the camera.

As shown in FIG. 21, when a camera movement signal is detected from the acceleration sensor Tm after the sector has already started the programmed exposure operations and before starting the closing operation (peak point P3), the control circuit Cc outputs no reversing signal to the motor M at the peak point P3 and the motor M continues the opening movement until a peak point P4 where an equal amount of exposure is assured. Then as the time that corresponds to the time for assuring the operation up to the peak point P4 elapses, the electromagnet 12 is controlled to rapidly close the diaphragm blades by the spring 10d. Accordingly, the shutter may be activated for a short exposure time which is effective for the camera movement upon assuring an adequate exposure to the object.

Next the case shown in FIG. 11 will be explained. When the driving ring 3 turns clockwise and reaches the position shown in FIG. 3 due to the clockwise rotation of the step motor 1, the control portion 10c follows the cam portion 3d, the electromagnet 12 is excited at the position P2 where the closing lever 10 has been rotated to an F number predicted corresponding to the brightness of the object and the electromagnet 9 is also excited.

When the step motor 1 rotates clockwise further, and the electromagnet 9 is demagnetized, the opening lever 7 is turned counterclockwise by the spring 7d and the shutter blades are rapidly opened, thereby starting an exposure. Since the step motor 1 starts to rotate counterclockwise at the same time when the electromagnet 9 is magnetized, the shutter blades are closed by the opening lever 7 due to the operation of the cam portion 3c from the stop value P2 restricted by the shutter blades to a speed which is dependent on the speed of the step motor 1.

Figure 17:
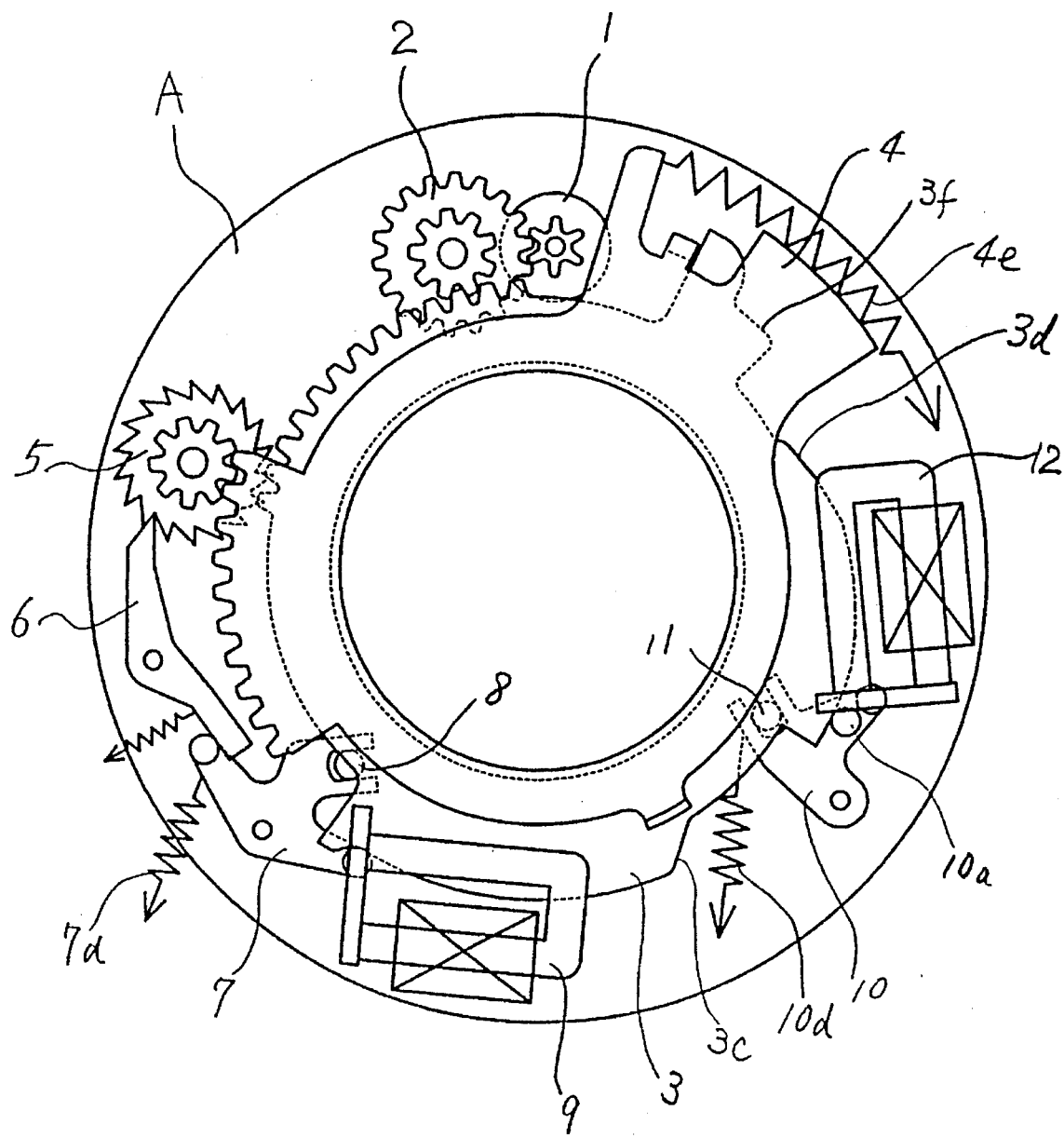
FIG. 17 is a plan view illustrating one embodiment of the invention before starting to activate the shutter.
Figure 18:
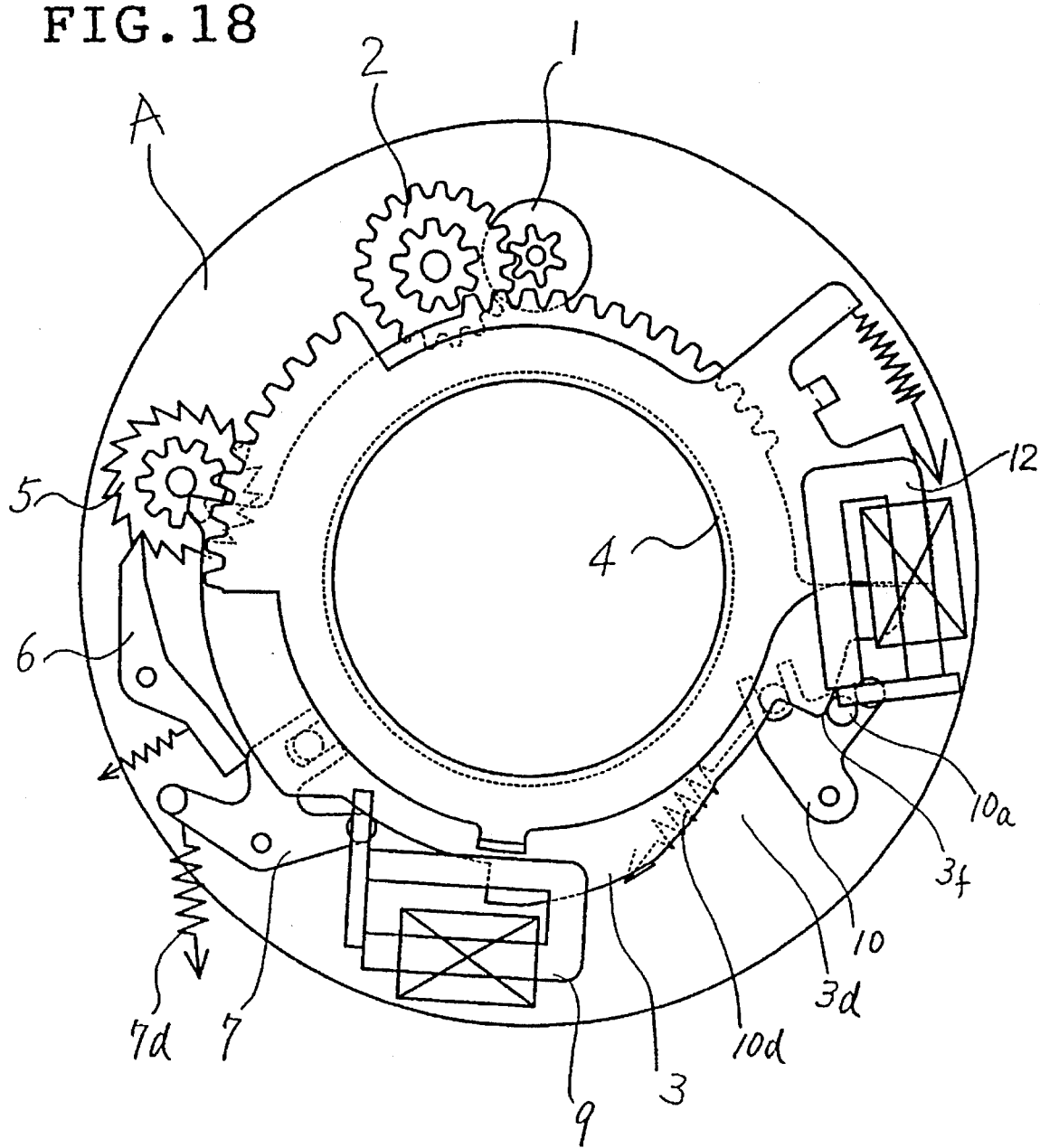
FIG. 18 is a plan view illustrating one embodiment of the invention right after holding a value of the shutter.
Figure 19:
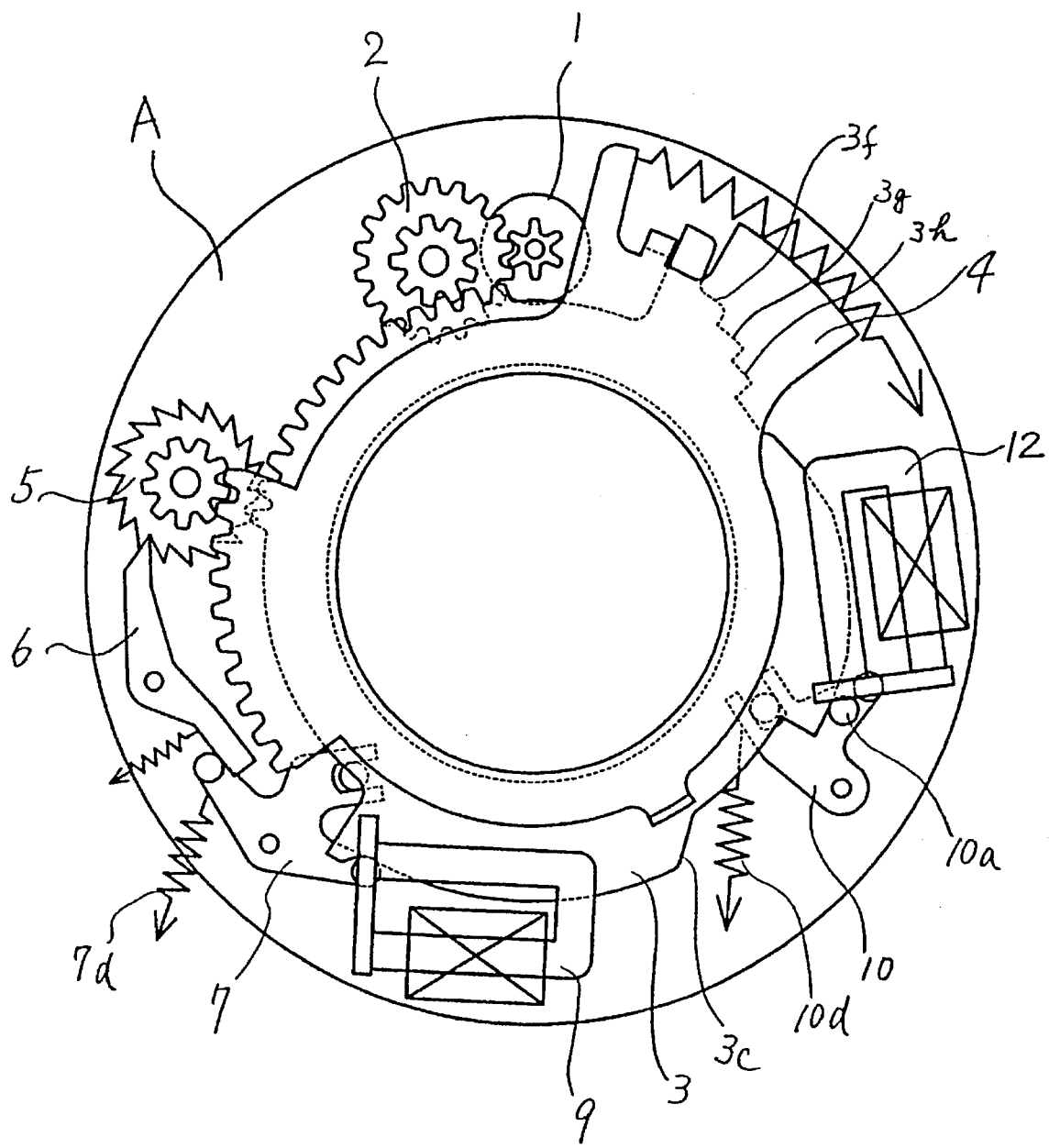
FIG. 19 is a plan view illustrating one embodiment of the invention before starting to activate the shutter.

Balb operation or time operation is achieved in the structure shown FIGS. 17, 18 and 19. FIG. 17 corresponds to FIG. 1, though it differs from FIG. 1 only in the part where the driving ring 3 is provided with a stepped portion 3f which reaches down to the cam portion 3d.

Accordingly, only the balb operation or time operation concerning the stepped portion 3f will be explained hereinafter. When an operation is started in a state when a balb mode or time mode is selected by the setting means Ms or switch Sw, the driving ring 3 and others operate as in the case described before and the driving ring 3 rotates clockwise while the electromagnet 12 is excited and is demagnetized after when the pin 10a of the closing lever 10 is held by the stepped portion 3f at the position shown in FIG. 18. Accordingly, the shutter blades maintain the opened state even after the demagnetization of the electromagnet 12. When the motor M rotates counterclockwise corresponding to either signal of the balb mode or time mode, the stepped portion 3f retreats from the pin 10a and the closing lever 10 is rapidly turned by the spring 10d, closing the shutter blades and ending the exposure.

Such modes may be adapted so that they can be freely selected according to the desire of a camera user and selected for adjusting the focus of a photographic lens only in a process of manufacturing or repairing the camera. Its uses may be expanded if a plurality of stepped portions 3g are created as shown in FIG. 19 to allow selecting an F number according to a purpose.

Next, exposure operations by means of day-light synchronization will be explained. Generally in a focal plane shutter, flash photographing is carried out by a precurtain synchronization (hereinafter called a presynchronization in the invention) and post-curtain synchronization (hereinafter called a post-synchronization in the invention) and respective different effects may be obtained for a moving object.

Figure 12:
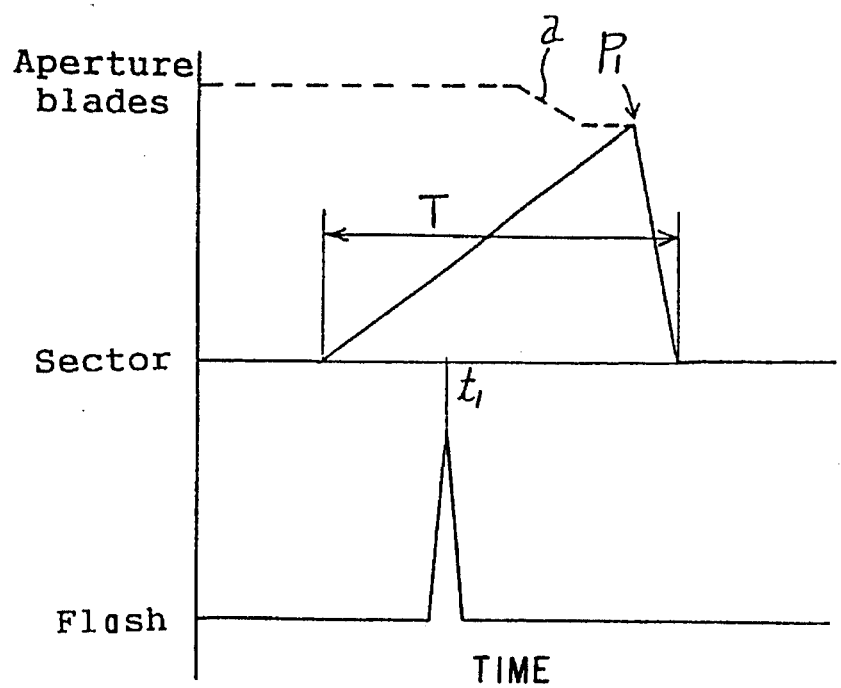
FIG. 12 is a diagram illustrating an operation by means of presynchronization according to one embodiment of the invention.

First in the case of the presynchronization, the operation of the shutter mechanism is the same as that shown in FIG. 10 and as shown in FIG. 12, wherein exposure operations in proportion to a brightness of a background are carried out, and a flash is flashed at a point t1 when a stop value that corresponds to the distance to the main object is reached in the process of the opening movement by the shutter blades.

Figure 13:
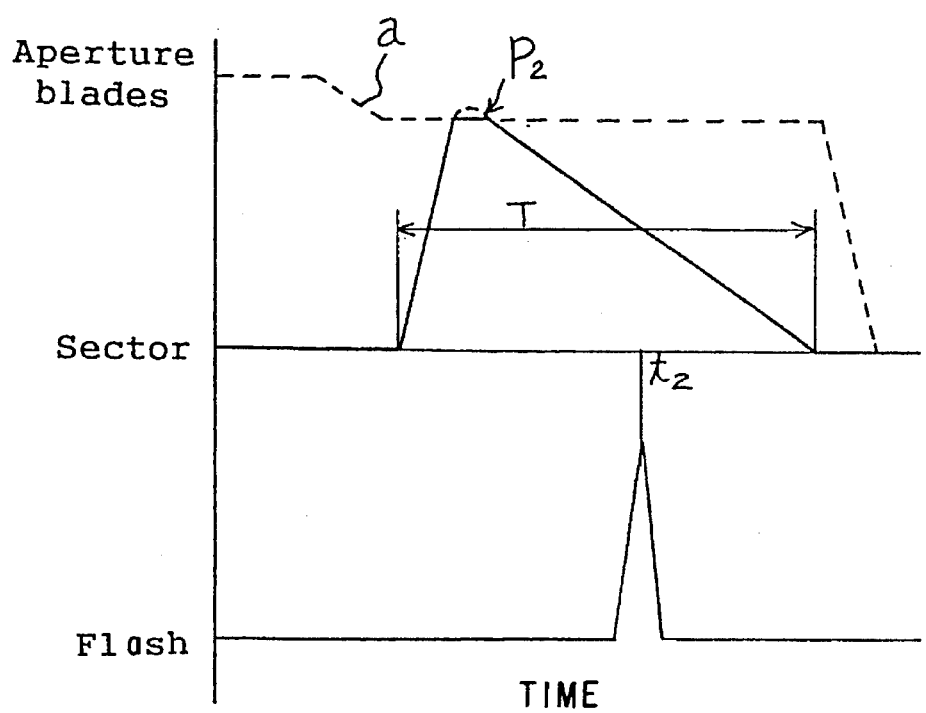
FIG. 13 is a diagram illustrating an operation by means of post-synchronization according to one embodiment of the invention.

In the case of post-synchronization, the operation of the shutter mechanism is the same with that shown in FIG. 11 and as shown in FIG. 13, wherein exposure operations in proportion to the brightness of the background are carried out and the flash is flashed at a point t2 when a stop value that corresponds to the distance to the main object is reached in a process of closing movement by the shutter blades. In the presynchronization and post-synchronization described above, movement of the camera may be caused because the total exposure time T is long. In such a case, the total exposure time T may be shortened, as follows.

Figure 14:
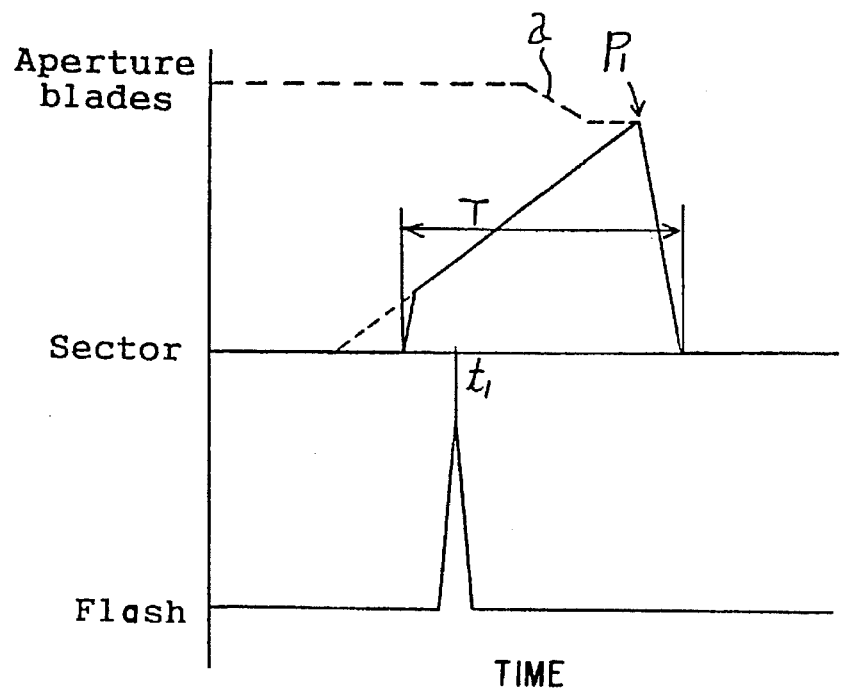
FIG. 14 is a diagram illustrating another operation example involving presynchronization according to one embodiment of the invention.
Figure 15:
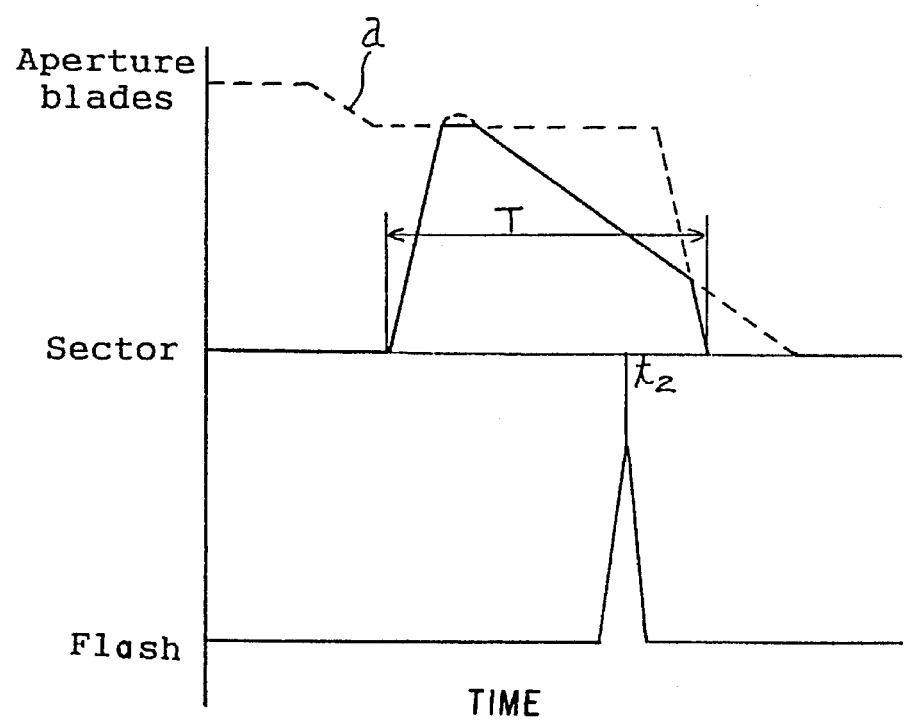
FIG. 15 is a diagram illustrating another operation example according to one embodiment of the invention.
Figure 23:
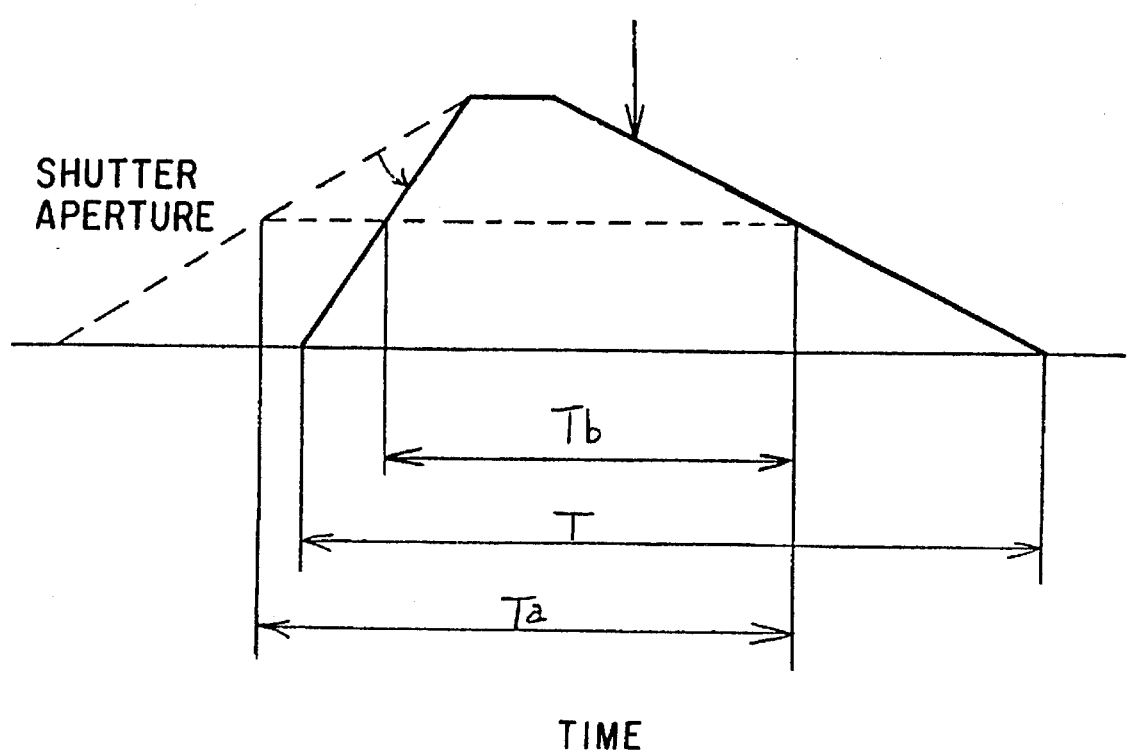
FIG. 23 is a diagram illustrating an operation of post-synchronization.

That is, in the presynchronization, because the demagnetization of the electromagnet 9 is carried out just before the flashing as shown in FIG. 14, the shutter blades are rapidly opened by the spring 7d only in the initial period of the operation and open thereafter at a speed of following the cam portion 3c to assure the presynchronization. In the post-synchronization, because the demagnetization of the electromagnet 12 is carried out immediately after the flashing as shown in FIG. 15, the shutter blades are rapidly closed by the spring 10d from halfway. Further, as shown in FIG. 23, when a signal output of the acceleration sensor Tm is detected even in the post-synchronization, the electromagnet 9 is excited and the opening lever 7 is deactivated, so that the sector is delayed to start the operation and the effective exposure time Ta becomes a shortened time Tb. In this case, when the electromagnet 12 is also activated with the timing shown in FIG. 15, the effective exposure time may be further shortened, allowing accommodation with the movement of the camera.

Accordingly, as is apparent from FIGS. 14, 15 and 23, the total exposure time T may be shortened, thereby reducing the risk of movement of the camera. Such switching may be readily realized by the arrangement of the present invention by automatically detecting that the total exposure time T has exceeded a limit that causes movement of the camera and by controlling the activation timing of the electromagnets 9 and 12.

In the case of FIG. 11 or 13 in the description above, it is also possible to rapidly activate the shutter blades to forcibly end the exposure operations as shown in FIG. 15 when the brightness of the object sharply changes after starting the exposure operation or when a flash of light of another camera is detected.

Figure 20:
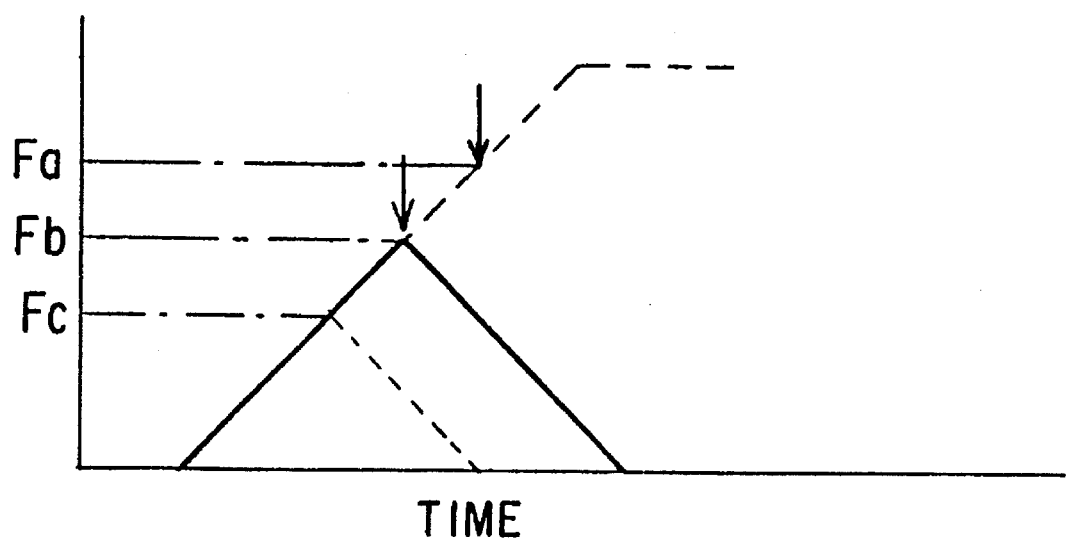
FIG. 20 is a diagram illustrating an embodiment of day-light synchronization.

Next, as for the day-light synchronization, an operation method which is remarkably different from the prior art concept will be explained referring to FIG. 22 as one of the embodiments of the present invention. As described above, in FIG. 20 which shows example operations of the prior art, when the flashing at the F number Fa which is computed from the distance to the main object is what gives an adequate exposure and when an adequate exposure to ambient light is an F number Fb, generally the flashing is carried out in the intermediate value Fc. In a picture photographed in this manner, illumination to the main object is insufficient and it presents an over-exposure to the ambient light. Such a case is often encountered when a figure standing at the window is to be taken together with a landscaping over the window.

Figure 22:
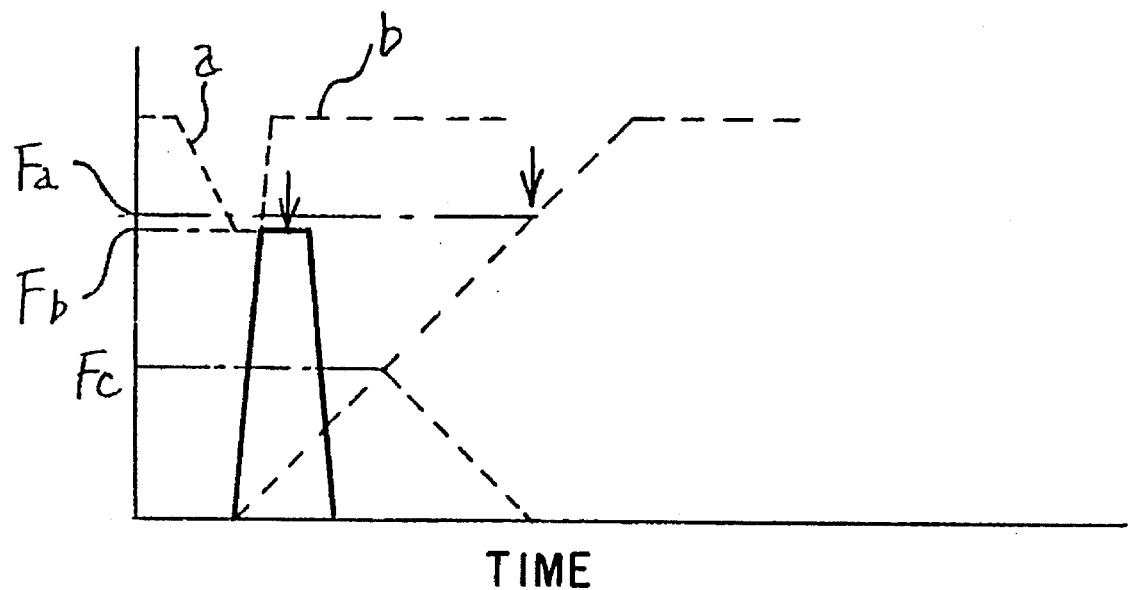
FIG. 22 is a diagram illustrating an embodiment of a day-light synchronization according to the present invention.

Then the operation according to the present invention shown in FIG. 22 is started upon selecting the day-light synchronization mode by the setting means Ms and switch Sw, the electromagnet 12 sets the diaphragm blades to a predetermined value Fc along diagram a and the electromagnet 9 operates the shutter blades along diagram b, properly adjusting the exposure to both the main object and the ambient light.

In this case, when the photometric circuit Bm detects that the brightness of the main object is illuminated not by total backlight but rather by natural light, it is a so called mixed light, so that the main object may be prevented from being over-exposed if the F number Fc is reduced by that amount.

In FIG. 16 described above, a photographing error may be prevented by taking a signal of the speed sensor Vm instead of that of the acceleration sensor Tm. That is, the speed sensor Vm detects that the speed of the object exceeds a predetermined value and outputs the signal instead of the signal of the acceleration sensor Tm to control the shutter so that the object within the photographing image may be photographed as a blur image within a minimum blur circle.

Further, in a case other than what described above, the shutter may be controlled with waveforms other than those in FIGS. 8 thru 15 and FIGS. 21 thru 23 by adequately controlling the activation timings of the electromagnets 9 and 12 by combinations of cam portions 13c and 13d.

Figure 8:
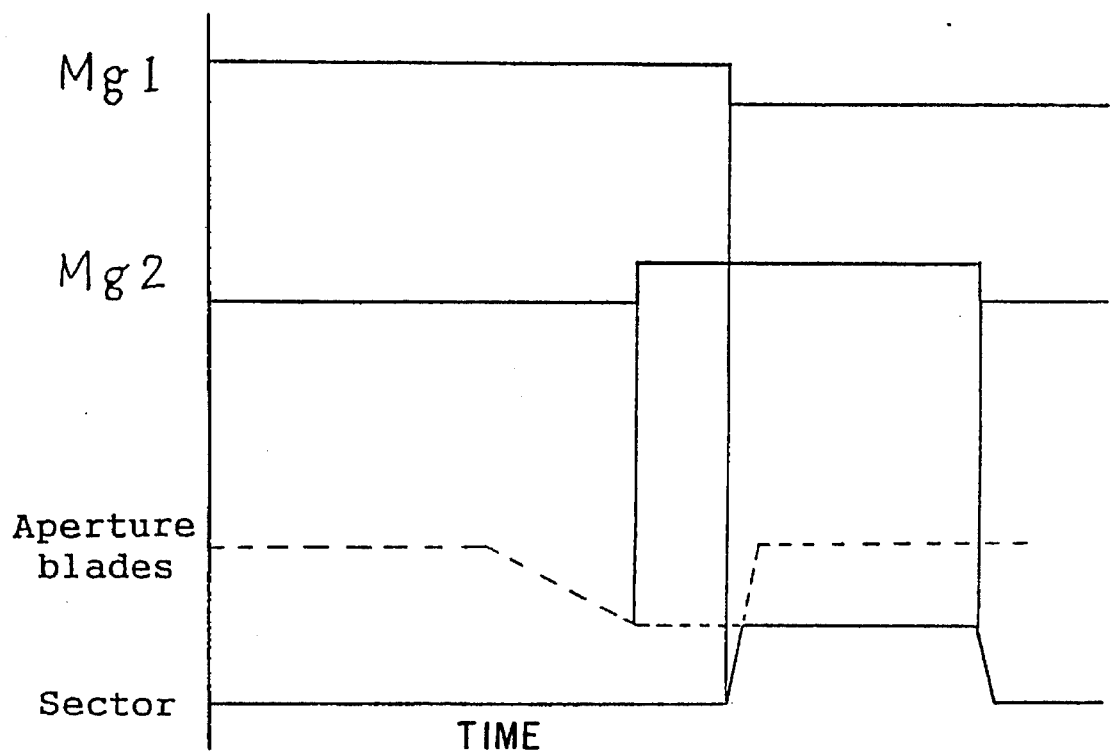
FIG. 8 is a diagram illustrating opening and closing operations by springs according to one embodiment of the invention.

Concerning the operation shown in FIG. 8, both controlling of the exposure time corresponding to the brightness of the object by setting an F number beforehand and controlling the F number according to the brightness of the object by setting the exposure time beforehand may be realized in the same concept. Further, both may be controlled by manual selection.

In the explanation set forth above, although concrete examples using the step motor have been disclosed, it is also possible to use other types of motor such as an ultrasonic motor, provided that the speed thereof may be freely controlled. The electromagnets 9 and 12 may also be ones which constrain and control the opening lever 7 and closing lever 10 by activating a plunger when it is fed, by turning a permanent magnet rotor or by other appropriate methods.

Although the aforementioned embodiments have been realized in the camera in which the lens opening is closed in the initial state, they may be realized as a type of shutter whose lens opening is opened in the initial state like a single-lens reflex camera. That is, it may be readily realized by a known method if it is constructed so that the opening lever 7 is activated not directly by the pin 8 but indirectly by an intermediate member through the intermediary of an elastic body.

The present invention may be realized even without the range ring 4 and ratchet 5 in the aforementioned embodiments as one aspect of the invention. The present invention is not limited to the aforementioned embodiments and modifications thereof may be realized by the same concept.

As it is apparent from the above explanation, according to the present invention, it is possible to control opening waveforms in accordance with photographing intentions by structuring the shutter so that opening and closing actions thereof are freely controlled and switched by the springs and motor and it is possible to shorten the activation timing as short as possible so that a shutter chance is not missed in the arrangement for setting a focus position of the photographic lens.

What we claim is:

1. A motor driven shutter for a camera in which the camera has a photographic lens, said motor driven shutter being adapted to be independently controlled by means of a single motor, comprising:

a driving member actuated by said motor and having a focus adjusting section for said photographic lens and a stop setting section for said shutter;

a focus adjusting means for setting said photographic lens into a selected one of a plurality of focus positions, said focus adjusting means being actuated by said focus adjusting section of said driving member upon one directional rotation of said motor;

a stop setting mean for setting an opening of said shutter into a selected one of a plurality of stop values, said stop setting means being actuated by said stop setting section of said driving member upon said one directional rotation of said motor;

said focus adjusting section being operable to actuate said focus adjusting means simultaneously as said stop setting section actuates said stop setting means during said one directional rotation of said motor; and said stop setting means being operable to set said selected one stop value independently of said focus adjusting means setting said selected one focus position.

2. A motor driven shutter for a camera in which the camera has a photographic lens, comprising:

a motor means;

a driving member driven by said motor means, said driving member having a focus adjusting section and a stop adjusting section;

a focus adjusting means for setting said photographic lens into a selected one of a plurality of focus positions, said focusing adjusting section of said driving member being operable to drive said focus adjusting means to said plurality of focus positions as said driving member rotates in one direction;

a stop setting means for setting the, shutter with a selected one of a plurality of stop values, said stop adjusting section of said driving member being operable to drive said stop setting means to said plurality of stop values as said driving member rotates in said one direction;

said locus adjusting section of said driving member and said stop adjusting section of said driving member being simultaneously driven in said one direction as said driving member rotates in said one direction;

said focus adjusting means comprising first setting means operable to set said photographic lens into said selected one focus position;

said stop setting means comprising second setting means operable to set said shutter means with said selected one stop value;

said first and second setting means being operable independently of each other.

3. The motor driven shutter according to claim 2 wherein said focus adjusting section comprising a first cam portion on one section of said driving member, said stop adjusting section comprising a second cam portion on another section of said driving member, said first cam portion on said one section of said driving member being operable to engage and actuate said focus adjusting means simultaneously as said second cam portion on said other section of said driving member engages and actuates said stop setting means.

\* \* \* \* \*